US005373746A

United States Patent [19]

Bloss

[11] Patent Number: 5,373,746
[45] Date of Patent: Dec. 20, 1994

[54] FLOWMETER WITH SNAP FIT MOUNT END CAPS

[75] Inventor: Kenneth R. Bloss, Michigan City, Ind.

[73] Assignee: Dwyer Instruments, Inc., Michigan City, Ind.

[21] Appl. No.: 16,427

[22] Filed: Feb. 11, 1993

Related U.S. Application Data

[63] Continuation-in-part of Ser. No. 9,924, Jan. 25, 1993, abandoned.

[51] Int. Cl.[5] .............................................. G01F 1/00
[52] U.S. Cl. ................................ 73/861.55; 248/221.4
[58] Field of Search ........................ 73/861.55, 861.57; 248/221.4, 27.3, 27.1

[56] References Cited

U.S. PATENT DOCUMENTS

| D. 283,804 | 5/1986 | Waters | 10/96 |
|---|---|---|---|
| D. 283,805 | 5/1986 | Waters | 10/96 |
| 3,213,189 | 10/1965 | Mitchell et al. | 248/27.1 |
| 3,751,971 | 8/1973 | Wilcox | 73/861.55 |
| 3,842,671 | 10/1974 | Frizelle | 73/861.57 |
| 4,050,305 | 9/1977 | Evans et al. | 73/861.55 |
| 4,317,376 | 3/1982 | Fitzpatrick | 73/861.55 |
| 4,559,834 | 12/1985 | Phillips et al. | 73/861.55 |

Primary Examiner—Richard E. Chilcot, Jr.
Assistant Examiner—Harshad Patel
Attorney, Agent, or Firm—John M. Mann

[57] ABSTRACT

An all molded flowmeter assembly that is especially adapted for use in connection with medical and laboratory type equipment applications for measuring and/or controlling fluid flow and is arranged for snap-fit mounting at its ends with respect to the flow monitoring panel normally provided such equipment, wherein the assembly is in the form of a basic flowmeter body and a selection of upper and lower end caps therefor that serve the usual intake and output functioning needed for devices of this type, including as options, where the application requires a metering system, end caps equipped with metering devices for pressure and vacuum applications; the general arrangement involved is such that the resulting flowmeter assembly provided by the basic flowmeter body and user selected end caps therefor may be readily assembled, and the resulting "whole" snap-fit mounted on such usual panel after suitably sized mounting aperturing is formed in such panel, and further, the general arrangement involved does not require any bracketry, hardware, or tools for application or removal of same with respect to such panel.

13 Claims, 5 Drawing Sheets

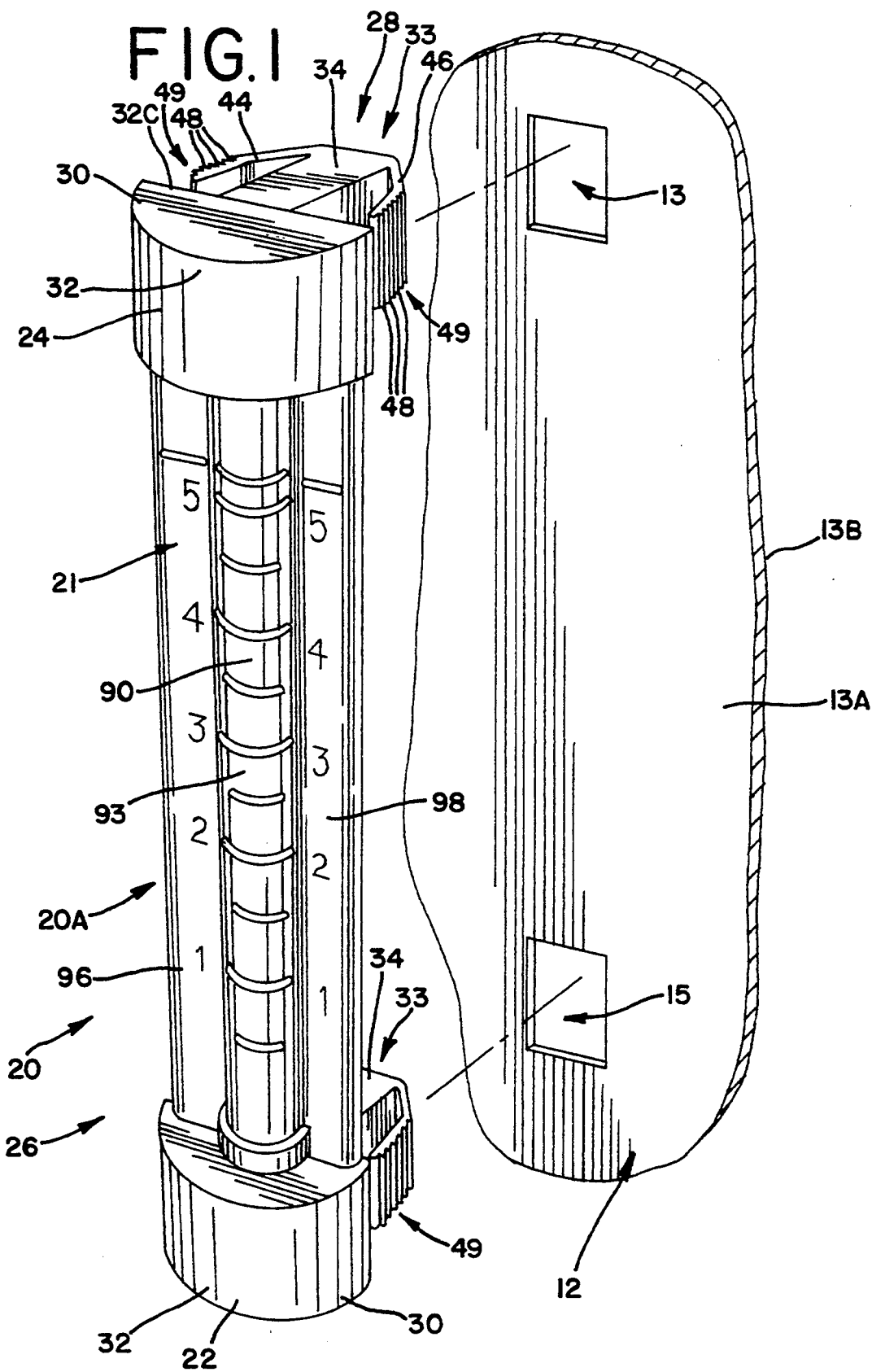

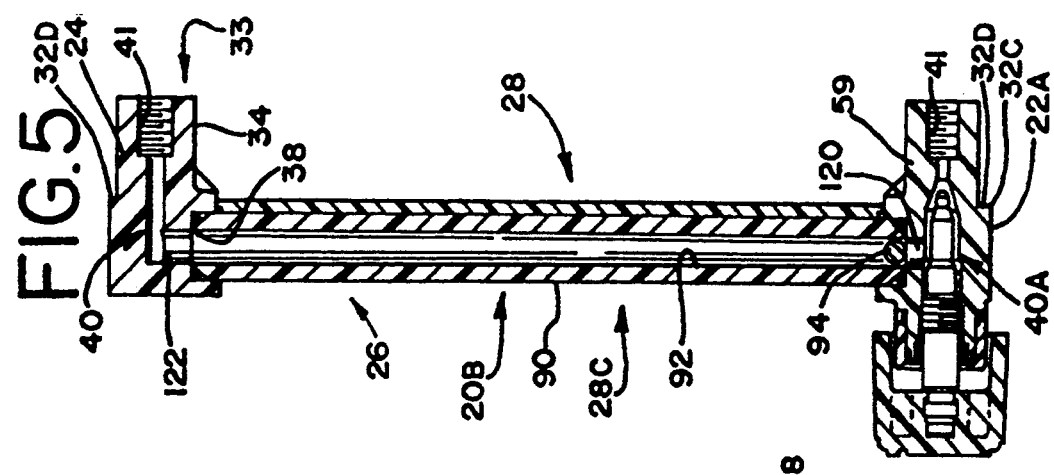
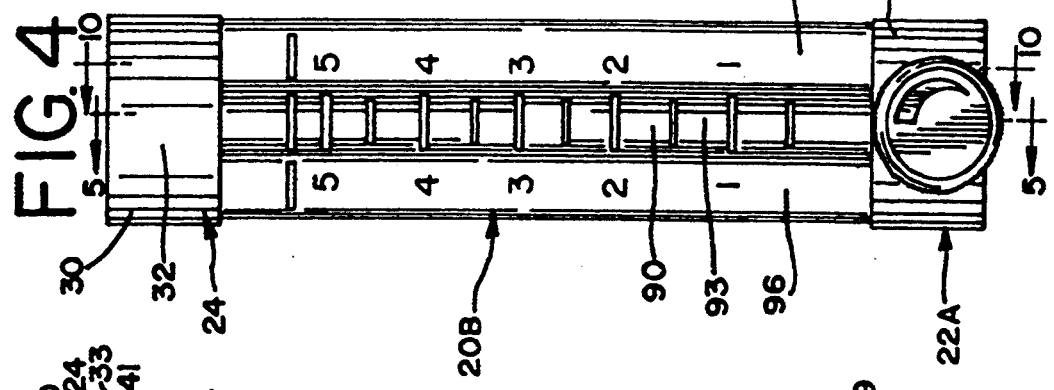
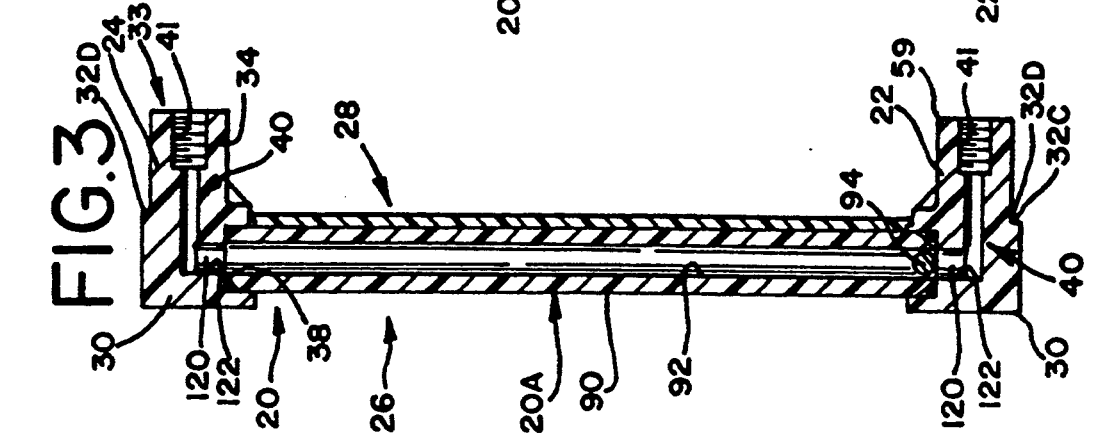
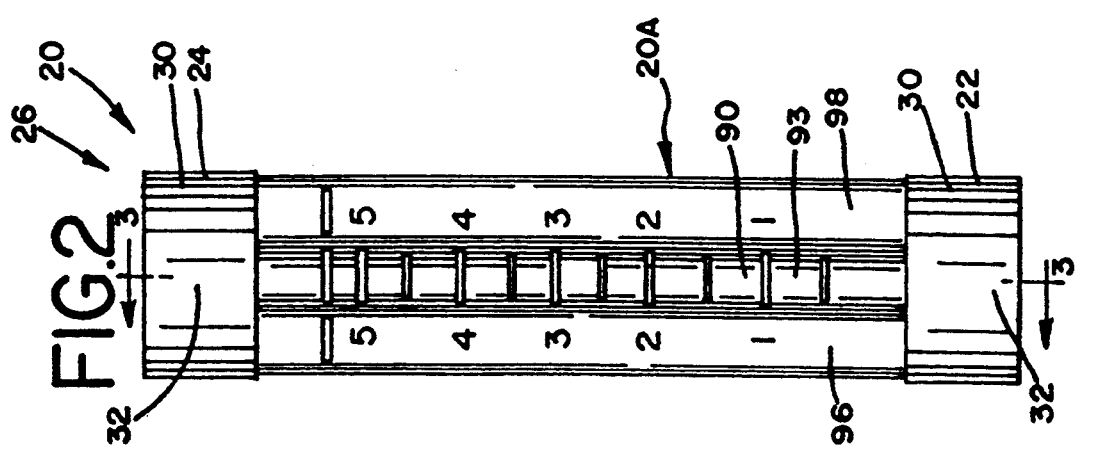

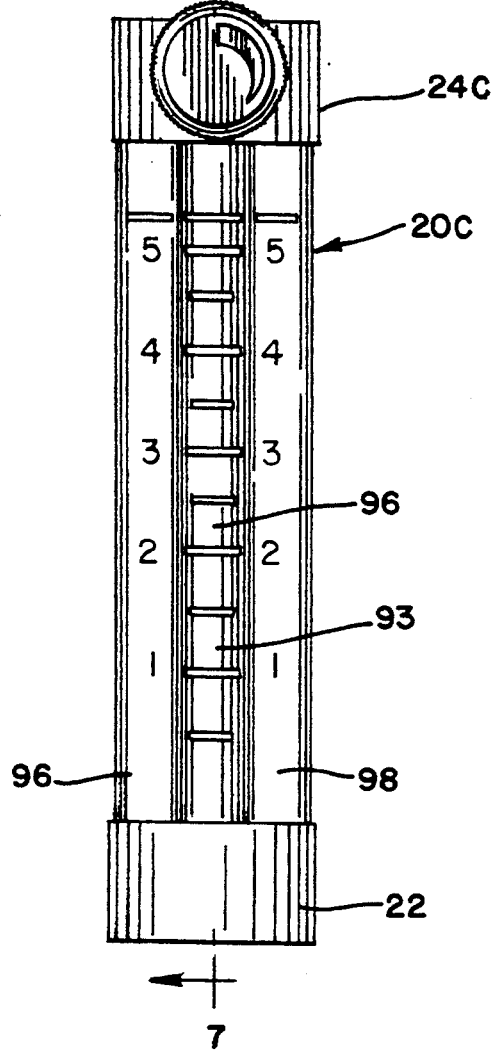
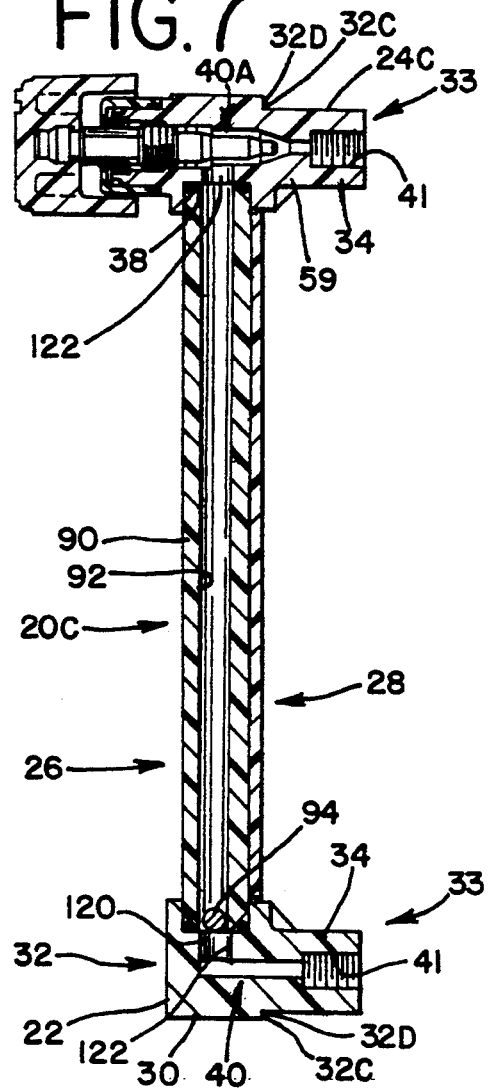
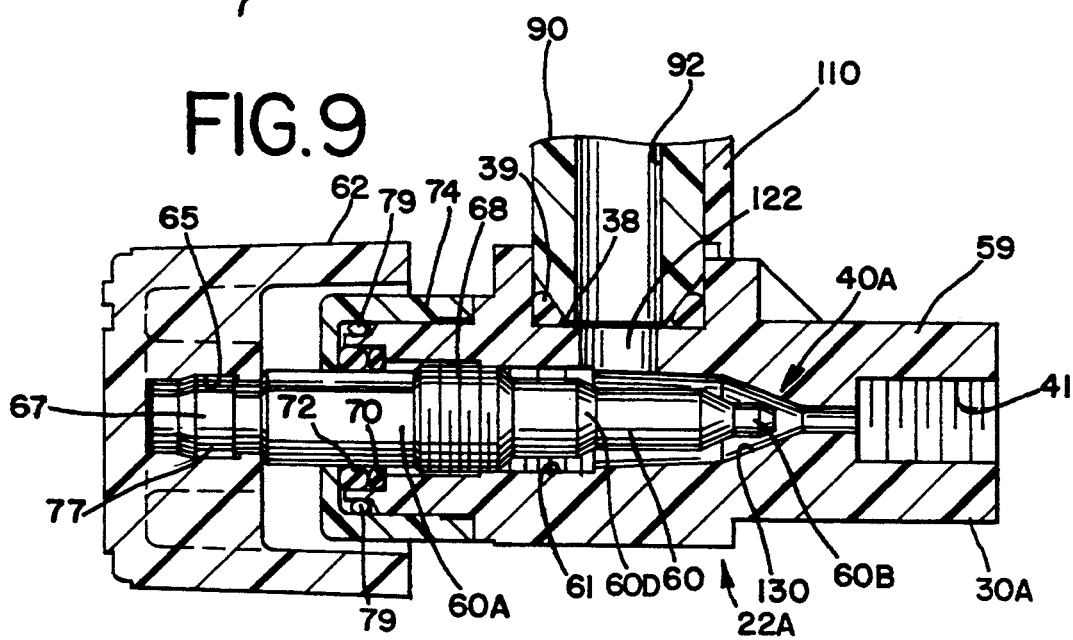

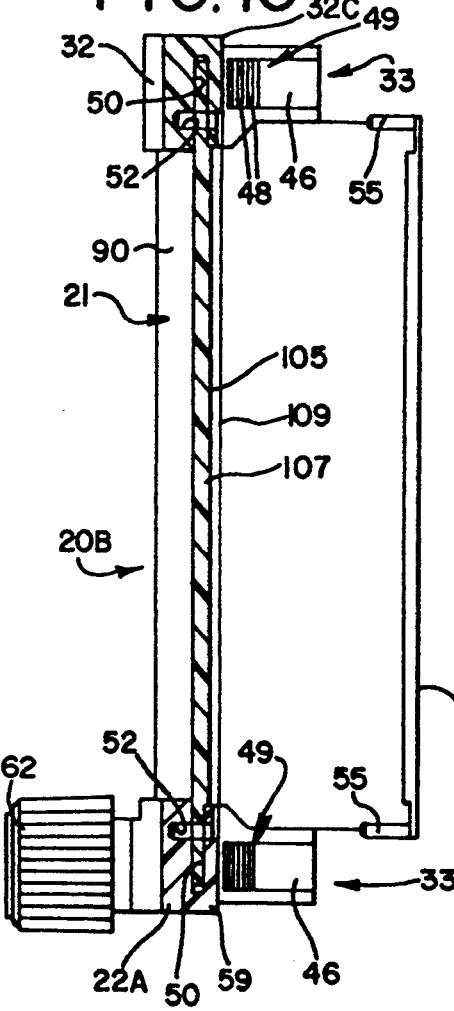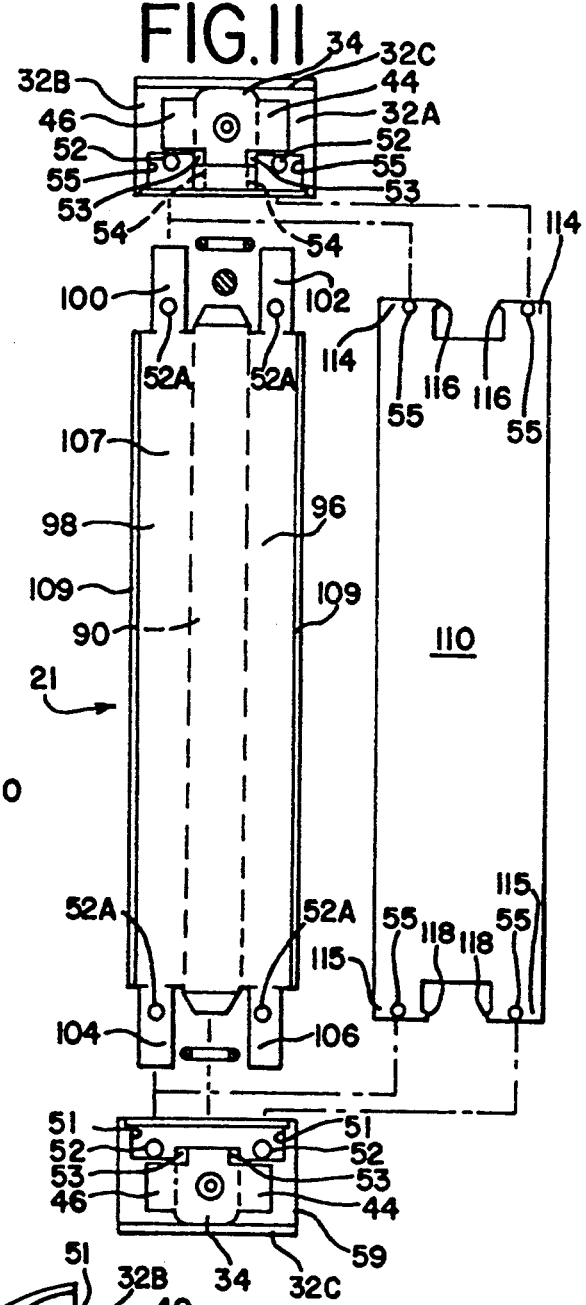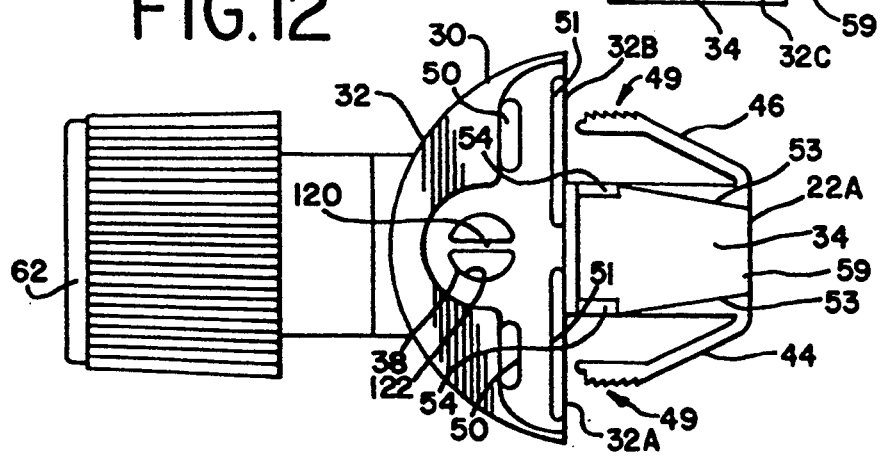

ically, the invention is concerned with a flowmeter as-
FLOWMETER WITH SNAP FIT MOUNT END CAPS This Application is a continuation-in-part of my application Ser. No. 08/009,924, filed Jan. 25, 1993 (now abandoned).

BACKGROUND OF INVENTION

This invention relates to a flowmeter assembly or unit that is particularly suited for medical and laboratory equipment applications for measuring and/or controlling fluid flows (both gas and liquid), and more particularly, the invention is concerned with a flowmeter assembly or unit that is mounted by snap fit applying in the flowmeter assembly or unit to the usual flow monitoring panel involved that greatly simplifies the installation or removal of the flowmeter assembly or unit, and does not require the user of the flowmeter assembly or unit involved to also supply bracketry, hardware, or tools for mounting or removing the flowmeter assembly or unit involved.

A major object of the invention is to provide an economical flowmeter assembly or unit of a type indicated that may also optionally, but not necessarily, include the necessary metering device for either pressure or vacuum handling applications, which flowmeter assembly or unit is arranged to mount such assembly or unit free of bracketry, hardware, or tools that have been formerly required to do same, by way of aperturing the usual panel therefor for snap fit mounting of the flowmeter assembly or unit directly on such panel, whereby installation and removal of the flowmeter assembly or unit is greatly simplified.

Another major object of the invention is to provide a flowmeter assembly or unit that is self contained in that it is complete in and of itself, and is also arranged to be snap fitted in association with the mounting panel normally provided therefor, in appropriate aperturing formed in said panel.

SUMMARY OF INVENTION

In accordance with the invention, an all molded flowmeter assembly or unit is provided that is especially adapted for use in connection with medical and laboratory type equipment for measuring and/or controlling fluid flow, that comprises a basic flowmeter body and a selection of upper and lower end caps therefor that serve the usual intake and output functioning needed for devices of this type, including as options, where the application requires a metering system, end caps equipped with metering devices for pressure and vacuum applications, and that is arranged so that the resulting flowmeter assembly or unit provided by the basic flowmeter body and the user selected end caps therefor may be readily assembled and the resulting "whole" snap fit mounted on the usual panel after suitably sized mounting aperturing is formed in such panel with which the flowmeter assembly or unit involved is to be associated, and further, that does not require any bracketry, hardware, or tools for application of same to the panel (or removal therefrom) to be supplied by the user.

BRIEF DESCRIPTION OF THE DRAWINGS

Other objects, uses and advantages will be obvious or become apparent from a consideration of the following detailed description and the application drawings in which like reference numerals indicate like parts throughout the several views.

FIG. 1 is a diagrammatic exploded perspective view, of the block diagram type, of a flowmeter assembly or unit arranged in accordance with the present invention, for applications not requiring a metering system, and the mounting panel therefor, including aperturing of the panel for snap fit mounting of the indicated flowmeter assembly or unit in association with the panel, in accordance with the present invention;

FIG. 2 is a front elevational view of one specific embodiment of the basic flowmeter assembly or unit that is diagrammatically illustrated in FIG. 1, and that is suitable for the aforementioned applications that do not require a metering system;

FIG. 3 is a sectional view of the flowmeter assembly or unit embodiment of FIG. 2, taken substantially along the line 3—3 of FIG. 2;

FIG. 4 is a front elevational view illustrating a second embodiment of the invention equipped with a metering device and arranged for use under pressure conditions;

FIG. 5 is a vertical sectional view of the flowmeter assembly or unit embodiment of FIG. 4, taken substantially along the line 5—5 of FIG. 4;

FIG. 6 is a view similar to that of FIG. 4, showing another embodiment of the invention equipped with a metering device and arranged for use under vacuum conditions;

FIG. 7 is an vertical sectional view of the flowmeter assembly or unit embodiment of FIG. 6, taken substantially along the line 7—7 of FIG. 6;

FIG. 9 is a further enlargement of the flowmeter metering system providing end cap shown in FIG. 5;

FIG. 10 is a view substantially taken along line 10—10 of FIG. 4, showing the flowmeter body back plate displaced to the rear of the flowmeter assembly or unit involved, indicating how the flowmeter body is connected to its upper and lower end caps;

FIG. 11 is a diagrammatic exploded plan view of the flowmeter assembly or unit taken from the rear side of same, indicating the parts involved in such an assembly or unit and the manner in which the back plate and flowmeter body for all the embodiments illustrated may be assembled prior to applying the freshly assembled assembly or unit to a panel of a type shown in FIG. 1; and FIG. 12 is a top plan view of a typical flowmeter assembly or unit end cap as arranged for snap fit application to and removable from a panel of a type shown in FIG. 1, that illustrated being of the metering system providing type shown in FIGS. 4, 8, and 10.

Figure 8:
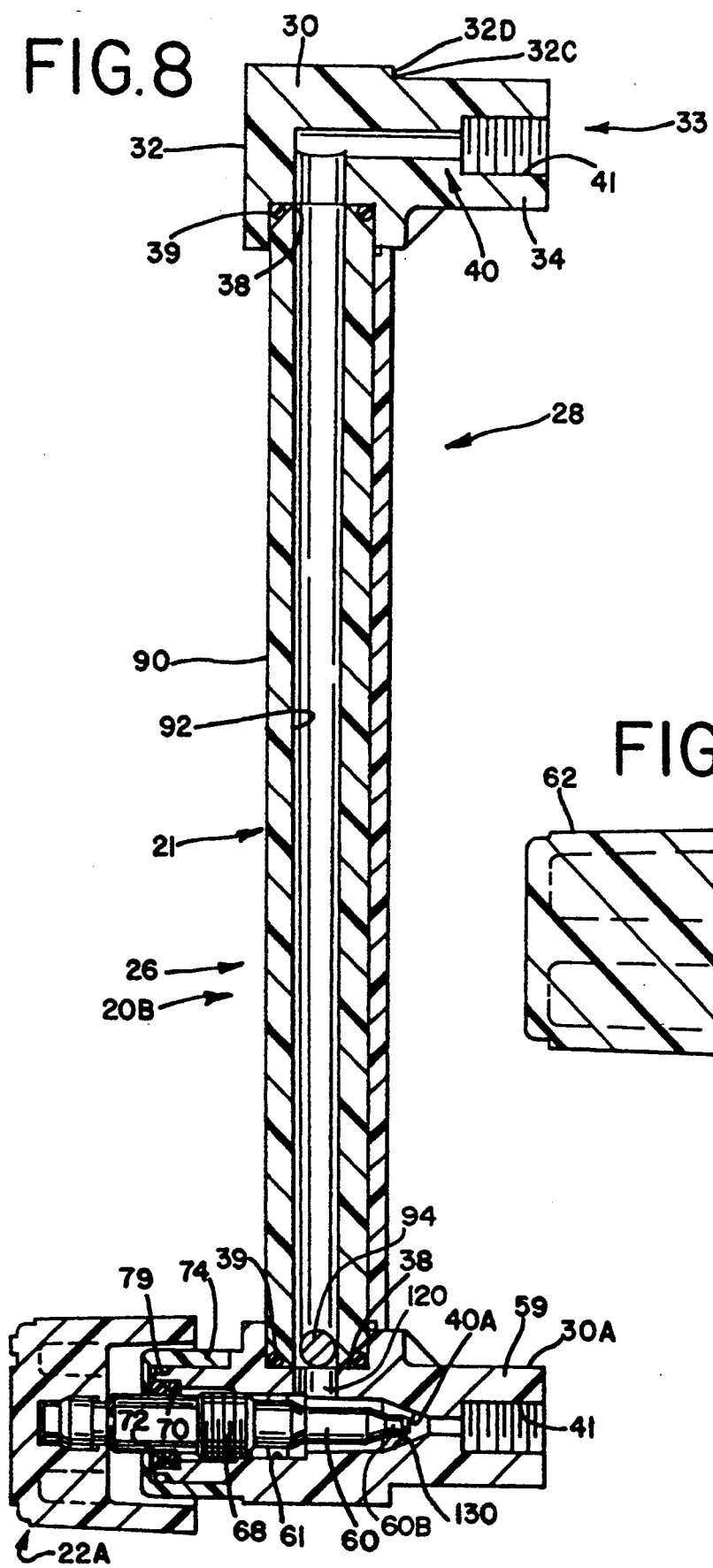
FIG. 8 is a enlarged sectional view of what is shown in FIG. 5.

However, it is to be understood that the specific drawing illustrations provided are supplied to comply with requirements of the Patent Laws, and that the invention is susceptible of modifications and variations that will be obvious to those skilled in the art, and that are intended to be covered by the appended claims.

DETAILED DESCRIPTION

The basic flowmeter assembly or unit 20 of this invention comprises a molded flowmeter body 21 having secured to the ends thereof a lower end cap 22 and an upper end cap 24 (see FIG. 1), of which end caps 22 and 24 are identical molded components that may be used either in the upper or lower end cap positions.

The flowmeter assembly or unit 20 preferably is also arranged in three basic embodiments 20A, 20B, and 20C, of which embodiment 20A is for applications not requiring a metering system, while embodiments 20B and 20C are for flowmeter applications requiring metering systems; the embodiment 20B (see FIGS. 4 and 5) comprises a flowmeter assembly unit in which the lower end cap 22A is formed to provide a metering system at the flowmeter inlet and operates under pressure conditions, while the embodiment 20C (see FIGS. 6 and 7) comprises a flowmeter assembly or unit in which the upper end cap 24C is formed to provide a metering system at the flowmeter outlet and operates under vacuum conditions; in both flowmeter assembly or unit embodiments 20B and 20C, the other end cap involved is a selected one of the identical end caps 22 and 24.

The molded making of flowmeter body 21 and flowmeter end caps 22, 22A, 24 and 24C may be effected in any convenient manner, with molding preferred because this expedites the making of the various flowmeter components involved, which may be selected and assembled by the user to form one of the flowmeter assembly or units 20A, 20B, or 20C, depending on the application for each flowmeter assembly or unit involved.

An important aspect of this invention is that once assembled for the flowmeter application to be performed, the respective flowmeter assembly or unit embodiments 20A, 20B, and 20C, are arranged to be mounted on the panel 12 so as to be positioned on the front side 13A of same (see FIG. 1), as distinguished from its rear side 13B, free of additional bracketry, hardware, and/or installation tools, but in snap fit association with the panel end cap receiving apertures 13 and 15, respectively, or other suitable aperturing, that is formed in the panel 12 for that purpose; furthermore, the flowmeter assemblies or units indicated as being so mounted may be snap fit removed from the panel 12, again without requiring additional hardware or removal tools. In other words, the flowmeter assemblies or units of this invention as assembled are fully self-contained for both panel mounting and removal purposes; furthermore, on removal of such flowmeter assemblies or units from the panel that snap fits mount them, the flowmeter components involved may be disconnected and reassembled for other flowmeter uses, or one or more of the flowmeter assembly or unit components may be replaced by a fresh component, and the flowmeter assembly or unit resulting then freshly snap fit applied to the panel therefor.

In the respective flowmeter assemblies or units 20A, 20B, and 20C, it will be observed that they define a front side 26 (see, for instance, FIGS. 1, 3, 5, 7, and 8), as distinguished from a rear side 28 (the latter being connected to the basic fluid flow system involved by the usual plumbing).

Further, and as indicated, the end caps 22 and 24 of the invention are identical and each comprises an end cap body 30 (see, for instance, FIG. 1), the forward portion 32 being of 180 degree arcuate configuration, and body 30 also defining panel seating surfacings 32A and 32B (see FIG. 12), and panel seating edging 32C (see FIG. 3) that has upright panel seating surfacing 32D (see FIGS. 3 and 5); surfacings 32A, 32B and 32D are in coplanar relation at the end caps rear 33 (see FIGS. 3, 5, and 7); these end cap surfacings and edgings serve primary functions in applying a flowmeter assembly or unit 20 to the front side 13A of panel 12, namely, they prevent the flowmeter assembly or unit 20 involved from being pushed through the panel aperturing 13 and/or 15 (where the panel aperturing is of a type illustrated in FIG. 1), and such end caps 22 and 24 conceal any irregularities in the initial forming of the panel apertures 13 and 15, such as burrs or sharp edges. Also, the basic end cap features mentioned above and hereinafter relative to end caps 22 and 24 are common to the other forms of end caps that are illustrated in the drawings (see, for instance, FIGS. 4–9).

At the end cap rear 33 of the respective end caps 22 and 24 is a rear portion 34 (see FIG. 1) that is of quadrilateral transverse section configuration, with respective end caps 22 and 24 at their said rear portions 34 being formed to define centrally located cross passage 40 (see, for instance, FIG. 3) that includes internal end threading 41 (for receiving the numerous forms of plumbing fittings that exist and can be used for suitably plumbing the flowmeter end caps in question); end caps 22 and 24 each include a seat 38 for receiving in a sealed manner (see the O-ring seal 39 in enlarged FIGS. 8 and 9) the respective ends of the flowmeter body 21 in fluid flow transmitting relation thereto (see enlarged FIG. 8, for instance). The end caps 22 and 24 on either side of their said rear portions 34 have mounted a pair of resiliently flexible side flanges 44 and 46 (see, for instance, FIGS. 1 and 10–12), which side flanges 44 and 46 are each similarly formed on the exterior surfacing of same at their respective projecting ends with a plurality of similarly shaped and located transversely extending teeth 48 forming a saw tooth edge portion 49 (of the respective end cap side flanges 44 and 46, see FIGS. 1, 10, and 12). The side flanges 44 and 46 of all the respective end caps disclosed herein are disposed as indicated in FIG. 12, and are to have their saw tooth portions 49 in engagement with the opposite vertical edges of a panel aperture 13 and 15 (see FIG. 6 of the Applicant's above identified said parent Application) to snap fit mount on the panel 12 one of the flowmeter assemblies or units 20A, 20B or 20C referred to above that has been assembled for the flowmeter application in question.

End caps 22 and 24 and the other end caps herein disclosed on either side of their respective seats 38 further are each formed with an elongated recess 50 (see FIG. 10), a cross recess 52, and have their said rear portions 34 tapered as indicated at 53 (see FIGS. 11 and 12) on either side of same that lead to the respective slots 54 (see FIGS. 11 and 12) on either side of same, and recesses 51 (see FIGS. 10 and 12) that are appropriately aligned with the respective cross-recesses 52 (see FIGS. 11 and 12), that are for fixing flowmeter body 21 thereto, as described hereinafter with regard to diagrammatic FIGS. 10 and 11.

End caps 22A and 24C (see, for instance, FIGS. 4 and 6, respectively) both provide for a metering system are of identical construction and configuration; they include all of the features described with regard to end caps 22 and 24 (as indicated hereinbefore), with their cross passages 40A (see FIGS. 5 and 7–9) being formed so that the knobbed end cap body 30A (see FIGS. 8 and 9) involved may be in the form of a valve body 59 that is internally threaded as at 61 to threadedly receive (note valve stem external threading 68) the valve stem 60 for engaging in a fluid flow shutoff manner against and about a tapered hole 63 (see FIG. 8) defined by the interior of valve body 59, whereby the user may appropriately use the threaded mounting of the valve stem 60 in the valve body 59, by way of the valve stem knob 62, to provide for fine adjustment of the process media flow (such as oxygen) through the respective end caps 22A and 24C. As indicated in FIGS. 8 and 9, the valve stem 60 includes a section 60A directly adjacent the threading 68 that is proportioned to allow the valve stem 60 to be "freewheeling", when backed out beyond the threads of the valve body threading 61, which prevents damage to the indicated valve body 59 or the valve stem 60. The interior of the valve body 59, namely at its modified cross passage 40A, contains a section (see FIGS. 8 and 9) at its front facing end to allow for a metallic or plastic retaining ring 70 and O-ring seal 72 to be mounted on the valve stem 60. The retaining ring 70 acts both to prevent removal of the valve stem 60 and to provide a rearwardly facing side sealing surface for the O-ring seal 72, the opposite side or front facing of which is sealed against screw cap 74 (that in the metering system end cap embodiment 22A illustrated in FIG. 9 is threadedly applied to the exterior of the body 59 itself); the interior of such O-ring seal 72 is sealed off against the valve stem 60, and the exterior of such O-ring seal 72 is sealed off against the interior of the valve body 59 (see FIGS. 8 and 9). By disposing the O-ring seal 72 in this position, such O-ring seal 72 acts to seal three surface interfaces at once, and thus effects a multiple sealing function. The valve stem 60 as installed in valve body 59 projects out of the valve body 59 in a frontal direction and is provided at its front end with a hex shaped extension 67 and a hex shaped rib 77 that is snap fitted into a hex shaped socket 65 of knob 62 to permanently mount the knob 62 on valve stem 60 in the embodiment of the invention illustrated in FIGS. 5, 8, and 9–12.

Figure 9A:
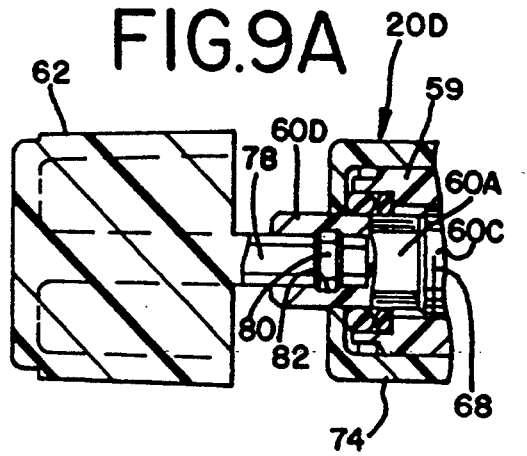
FIG. 9A is a view similar to that of FIG. 9 illustrating a modified form of valve control arrangement that may be employed in connection with the end cap located valving system shown in FIGS. 5 and 7-9.

Alternately, as shown in FIG. 9A, the valve stem 60C may be proportioned to, as installed in a valve body 59, project out of body 59 and terminate at the front of such body 59, as indicated by reference numeral 60D; the knob 62 is suitably affixed to the hex shaft 78 that is received in valve stem section 60A, with the valve stem section 60A in such case being equipped with a hex socket 82, and the knob hex shaft 78 that is formed with an enlargement 80 of hex configuration that is received in the said socket 82. The hex shaft 78 is thus an extension of knob 62, which is used by the user of the installed flowmeter assembly or unit that includes the screw cap 74 of FIG. 9A, to rotate the valve stem 60A so that its threads of threading 68 operate in the usual threaded manner with regard to the threading 61 of valve body 59 involved (see FIG. 9), to cause either an increase or decrease in the size of the variable orifice involved and adjust the flow of the process media accordingly. The knob 62 associated with the hex shaft 78 (see FIG. 9A) may be repeatedly applied and removed from the valve stem socket 82, but will not fall out accidentally due to vibration or during normal adjustment. The minimal protrusion 60B of this valve stem 60 out of the front of the flowmeter assembly or unit involved, in which this feature is incorporated, makes the metering device involved tamperproof if the knob 62 is removed.

The molded flowmeter body 21 is molded from a suitable clearly transparent acrylic material and in plan has the configuration best shown from its rear side as indicated in FIG. 11, and includes tubular portion 90 (see FIG. 3) having a tapering bore 92 (see FIG. 3) and front surfacing 93 (see FIGS. 1, 2, 4, and 6) that is convexly rounded (circularly arcuate) about the central axis of bore 92 (see, for instance, FIGS. 3 and 4); the bore 92 is tapered in the usual flowmeter fashion and receives the usual ball type float 94 that, for the "no" flow condition, rests on the end cap cross flange 120 of the aperture 122 that is open to bore 92 (see, for instance, FIG. 8). The flowmeter body 21 as molded also has integral therewith identical side flange portions 96 and 98 (see, for instance, FIGS. 1 and 6) that are in coplanar relation and at their ends are formed with extension or projections 100, 102, 104, and 106 (see FIG. 11) that are intended to be received in the spaced elongate apertures 50 (see, for instance, FIG. 10), of any of the flowmeter end caps herein disclosed, for assembling the flowmeter assembly or unit involved and affixing the flowmeter end caps of same to the flowmeter body 21; the herein disclosed end caps also are formed to define the afore referred to spaced cross apertures 52 (see FIG. 10) that receive the respective locking pins 55 that are integral with the assembly or unit back plate 110 (see FIGS. 10 and 11), as do apertures 52A that are suitably formed in the afore referred to flange extensions 100, 102, 104, and 106, respectively, these components being proportioned such that the respective apertures 50 and 52 are aligned to receive the locking pins 55 when the component parts of a flowmeter 20 are assembled as indicated in FIGS. 10 and 11 (as hereinafter described).

Body 21 at its rear is indented as at 105 to define planar surfacing 107 and longitudinally extending edge walls 109 (see FIG. 10) that receive back plate 110 that is employed in accordance with this invention, to secure together the flowmeter components selected to form a specific flowmeter assembly or unit.

The back plate 110 is molded to the shape indicated using a resiliently flexible plastic material that is preferably white or a light colored material, with the back plate 110 defining at each end oppositely directed extension pairs 114 and 115, respectively, which pairs 114 and 115 are respectively formed with opposed projections 116 and 118 and their integral locking pins 55 (see FIG. 11), respectively, that are to be aligned with the end cap and flowmeter body apertures heretofore described.

After selecting the end caps 22, 22A, 24, and 24C to form a particular flowmeter assembly or unit from a group of such end caps (depending on the application), the selected end caps and flowmeter body 21 are assembled in fixed relation in the manner indicated in FIGS. 10 and 11, whereby both the end caps selected are oriented to dispose their rounded body portions 32 at the front of the flowmeter body 21 (this being done before the resulting flowmeter is to be applied to panel 12).

Thus, with such selected and oriented end caps being fitted on the respective ends of the flowmeter body 21 at seats 38 (which, as has been indicated, are suitably apertured for free flow media fluid flow through the flowmeter, and through aperture 122 on either side of cross flange 120 that acts as a float stop for the respective end caps), and the flowmeter body projections 100, 102, 104, and 106 (see FIG. 11) being lodged in the respective end cap apertures 50 (see FIG. 10), the back plate 110 is oriented with respect to the resulting partially assembled flowmeter as shown in FIG. 10, with its integral locking pins 55 aligned with the cross apertures 52 (of the selected flowmeter body 21) and is moved into the flowmeter body back indentation 105, which action slides the back plate 110 extension pairs 114 and 115 along the respective end cap rear projection tapered surfaces 53 (see FIGS. 11 and 12) to cam such extension pairs 114 and 115 (at each end of the back plate 110, (see FIGS. 10 and 11)) away from each other until they snap into the end cap locking slots 54 that are present in the respective end caps disclosed herein, and that are open to and normally disposed with the respective recesses 51. Note also the sealing action that O-ring seal 39 has with both the respective seats 38 and the tapered tube portion ends of body 21, as clearly shown in FIGS. 8 and 9.

Some specific aspects of this development are pointed out as follows:

The basic flowmeter body 21 is molded from clear acrylic and provided with a curved central surface 93 upon which the indicated hot stamped graduation indicia is to be applied; to each side of the body tubular portion 90 are the flanges 96 and 98 that are aligned in coplanar relation, and which have applied thereto, by hot stamping, numbers corresponding to the actual calibration of a flowmeter for a particular application; also, the application of such numbers to the indicated side flange portions 96 and 98 disposes such numbers on both sides of the flowmeter centrally located bore 92, so that such numbers can be seen from angles encompassing 90 degrees to either side of the flowmeter bore 92, from its front 26. As the front surface 93 of the tubular portion 90 of the flowmeter body 21 is arced about the center line of bore 92, the showing of the bore 92 and its float 94 to either side of the bore 92 up to the indicated 90 degree angulation eliminates distortion of the bore 92 and float 94 since the center line of the bore 92 is along the same axis as front surface 93.

The hot stamp die afore referred to, for forming such numbers in the flowmeter body, is preferably designed in such a way as to match the curvature of the front of the flowmeter body 21, with such hot die stamping also providing a physical indentation in the flowmeter body 21 at appropriate graduation locations (such as those that have been illustrated) that may be accented by a dark colored ink (it having been found that the combination of the two provide better resistance to normal cleaning of the flowmeter body at its surface 93 and the corresponding front surfaces of the side flanges 96 and 98, than a surface decorating process).

The flowmeter body tubular portion 90 contains the variable orifice bore 92 that the fluid media (hereinafter called "process media") will pass through in moving to and from a flowmeter body 21, and the flow involved is measured by the level at which the float 94 achieves steady state relative to the graduations imprinted on the external surface 93 of the flowmeter body 21. The flowmeter body 21 is plumbed to the respective end caps involved, via the respective end cap seats 38, each of which is equipped with an O-ring seal receiving space (due to the illustrated tapering of the ends of the tubular portion 90). As indicated in FIG. 8, at each end of the tubular body tubular portion 90, such body 21 is disposed in sealing relation with suitable O-ring seal 39, which sealing relation is effected in accordance with the present invention by securement of the flowmeter body four projections 100, 102, 104, and 106 that respectively are received in the respective apertures 50 of the respective end caps involved (see FIGS. 10 and 11). Thus, in the process of assembling a particular end cap to the flowmeter body 21, the flowmeter body 21 must be applied so that its tubular portion 90 is inserted straight into such end cap, and the end cap that is to be applied to the other end of the flowmeter body tubular portion 90 is to be similarly handled; thereupon, the back plate 110 (see FIGS. 10 and 11) is applied behind the flowmeter body 21 in the herein disclosed manner, thereby preventing separation of the flowmeter mating parts by eliminating the ability of the respective flowmeter end caps to be removed from the flowmeter body 21.

In accordance with this invention, the flowmeter body 21 covers the front facing portion of the back plate 110, concealing the back plate 110 from being seen directly from the front of the instrument, once the instrument is applied to a panel 12, in accordance with the present invention. The flowmeter back plate 110 preferably is formed by being molded from a white colored plastic material to provide a reflective background to assist in reading the flowmeter float position relative to the flowmeter scale graduations (that have been diagrammatically illustrated), when the flowmeter is in operation. Options relative to the back plate include painting or taping of a phosphorescent material to the rear side of the back plate 110, whereby the back plate 110 will illuminate the flowmeter assembly or unit involved even when inadequate external lighting is provided at the use sight of the flowmeter in question.

A second option relative to the back plate 110 is that a second set of graduations corresponding to the graduations at the front of the flowmeter body 21 may also be pad printed on the back plate 110 to provide improved alignment of the float 24 with the scaling involved, and avoid parallax error.

Another option regarding the back plate 110 is that it may be tinted with one of various colors, as may be specified by customer preference.

Yet another option relative to the back plate 110 that is available involves using a fiber optic receptacle suitably disposed in the flowmeter body 21 that will illuminate the float 24 and flowmeter front scaling that has been referred to, providing light to assist in direct reading of the flowmeter, and as a recharging mechanism for the indicated phosphorescent surfacing that has been mentioned; such a fiber optic system where employed will allow a single remote lighting source to serve multiple flowmeters (one of the types herein disclosed, or conventional flowmeters).

As has been indicated, the flowmeter end cap arrangement herein disclosed allows a metering system to be placed either at the inlet or the outlet of the flowmeter involved, or permits the user to employ no metering system at all, depending on the application that the particular flowmeter is to be applied to.

The end caps 22, 22A, 24, and 24C are each designed with side flanges 44 and 46 (see, in particular, FIGS. 1, and 10 through 12) that project out and away from the end cap involved and that are the means of snap fit mounting a flowmeter assembly or unit 20 (that is, embodiments 20A, 20B, and 20C that are herein disclosed) with regard to a particular panel 12 (the wording "flowmeter assembly or unit 20" is meant hereinafter to mean anyone of such embodiments 30A, 20B, and 20C). The side flanges 44 and 46 of such unit end caps are shaped to act during installation to help guide the assembled flowmeter assembly or unit 20 into the panel aperturing therefor that has been formed in the panel, the assembled flowmeter assembly or unit 20 being applied to the forward side 13A of the panel 12, and from its forward or front side. The indicated side flanges 44 and 46 of the end caps of the assembly or unit 20 are each equipped with multiple teeth 48, running across the end portion of the respective side flanges 44 and 46, which teeth 48 are present for the purpose of engaging the panel aperturing up tight edges in a ratcheting manner as the assembled flowmeter assembly or unit 20 is applied to the panel 12 from its front side. As is clear from this disclosure, side flanges 44 and 46 and their respective toothed edge portions 49 are considered a "snapping mechanism" for each flowmeter end cap, such that when the respective end caps involved of a particular flowmeter assembly or unit 20 (that have been assembled in accordance with the flowmeter application to be made of same, and in accordance with the present invention) they will include such "snapping mechanism", and in an integral manner, for the purpose of mounting and securely fastening the resulting flowmeter to any particular panel.

Thus, the Applicant's end caps, and thus the flowmeter assembly or unit 20 as a whole, may be applied to panels 12 of varying thickness, and the "snapping mechanism" thereof disposed within apertures of varying widths, without requiring any tools or additional bracketry to be supplied for flowmeter mounting purposes. The aperturing employed may be of the two (2) aperture type shown in FIG. 1, or a single aperture extending the length of the flowmeter assembly or unit 20, though, of course, the aperturing arrangement shown in FIG. 1 significantly limits the size of the aperturing that is to be formed in a panel to mount the indicated flowmeter assembly or unit 20 that has been selected for the particular flowmeter application that needs to be satisfied. Thus, the panel aperturing required of the flowmeter assembly or unit 20 can be of two (2) basic configurations, namely a single rectangular aperture large enough to accommodate both the "snapping mechanisms" of the two end caps involved, or two smaller rectangular holes each proportioned to accommodate a single end cap pair of "snapping mechanisms" (see FIG. 1) of the assembly or unit 20 that is involved; the snap fit mounting arrangement of FIG. 1 (that has been referred to) has the advantage of essentially maintaining the strength of the panel 12, while essentially maintaining the integrity of the panel.

Both assembly and removal of the flowmeter assembly or unit 20 is accomplished by compressing the "snapping mechanisms" formed by the respective pairs of side flanges 44 and 46 of the respective end caps, and providing suitable clearance between the respective "snapping mechanisms" in the panel 12 for the flowmeter assembly or unit 20 to either be inserted or removed from the panel 12. Obviously, the end caps herein disclosed should be formed from a resilient plastic material so that the herein disclosed side flanges 44 and 46 have the resiliency required to bring their saw tooth edge portions 49 in gripping relation with the side edges of the panel aperturing to which the respective "snapping mechanisms" are applied.

The end caps 22, 22A, 24, and 24C are also provided with rearwardly facing panel seating surfaces 32A and 32B at the rear 33 (see FIG. 11) of the respective end caps, as well as the rearwardly facing surfacing 32D provided by edging 32C (see, for instance, FIGS. 3 and 5) at the end cap rear 33. The indicated surfaces 32A, 32B, and 32D serve several primary functions, namely they act to physically engage the panel 12 and prevent the flowmeter "snapping mechanisms" from being pushed through the panel during the snap mounting process, and also, such surfaces conceal any irregularities of the panel aperturing that might be involved, for instance burrs, sharp edges, or other misshaping.

Flowmeter applications not requiring a metering system are supplied by a flowmeter assembly or unit 20 complete with end caps 22 and 24 (see FIGS. 2 and 3), or just a pair of end caps 22, or just a pair of end caps 24 (end caps 24 being identical to end caps 22). The resulting flowmeter assembly or unit 20 has a physical profile which blends readily with that of panel 12, making a flowmeter assembly or unit 20 involving flowmeter body 21 and end caps 22 and 24 (as described above) unobtrusive. Of course, the end caps selected for the non-metering type flowmeter system in question can be made available with hot stamped designs or lettering, such as suitable logos imprinted onto their front faces 32, as the user of such equipment desires.

Flowmeter applications requiring a metering system in accordance with the present invention involve a flowmeter assembly or unit 20 equipped with a end cap 22A or a end cap 24C (both of which are identical and equipped to provide such a metering system), with the end caps 22A or 24C being located at either the inlet or outlet of the flowmeter (depending on the flowmeter application), with one of the non-metering system providing end caps 22 or 24 being assembled, as heretofore indicated, to the other end of the flowmeter body 21 (see, for instance, FIGS. 2 through 5). The metering involved is accomplished by the tear drop shaped tip 60B of valve stem 60 (see FIG. 9) being engaged against a tapered orifice 130 on the interior of the respective end caps 22A or 24C (namely the valve body 59 thereof). The valve body 59 making up the respective end caps 22A and 24C is, in accordance with this invention, molded complete with internal threading 61 of valve body 59 to threadedly accept the valve stem's external threading 68, for providing a positive positioning of the tear drop shaped tip 60B of the valve stem 60 relative to the tapered internal orifice surfacing of the end cap in question (defining in part the orifice 130 therefor) that provides for a controllable metering device. In the flowmeter forms shown in FIGS. 4-9, two basic sizes of such tapered orifices may be defined by the tapered internal surfacing of the respective metering system providing end cap bodies 59 to better control the metering at various float rates, depending on the flowmeter application involved, with the smaller of the two sizes being used for lower float rates. In the case of the smaller orificing 130 involved in any such body 59, the valve stem 60 will first seat on the smaller tear drop portion of the valve body 59, and if over-torquing should occur, with a movement action rearwardly of the flowmeter assembly or unit 20, the larger tear drop portion 60D of the valve stem 60 will engage the internal surfacing 130 of the valve body 59, thereby preventing damage to either of the tip 60B of the valve stem 60 or the body 59 of the end cap involved. The rotational orientation of the valve stem 60 is assisted by using knob 62 permanently affixed to the forwardly directed, and externally projected end of the valve stem 60 at the front side of the flowmeter assembly or unit 20 (see FIG. 9) in which the knob 62 is recessed to define a socket 65 that receives rib 77 defined by the valve stem 60 as shown in FIGS. 8 and 9; O-ring seal 72 is in sealing relation with both the valve stem 60 and the end cap body 59 via retaining cap 74, with the retaining cap 74 for the valve stem 60 preventing the process media from leaking out the respective end caps 22A and 24C, from the desired flow path through the end cap involved (note O-ring seal 79 that is interposed in sealing relation between valve body 59 and retaining cap 74). The valve stem cap 74 is secured to the respective end cap bodies 59 by way of its suitable internal threading engaging external threading of such bodies 59 at the front of same. The cap 74 also acts to restrict removal of valve stem 60 either intentionally or inadvertently. The threaded engagement of the valve stem 60 with the respective end cap bodies 59 is such that when the valve stem 60 is "backed out", that is, moved forwardly of the flowmeter assembly or unit 20, the valve stem 60 becomes disengaged from the end cap body 59 in which it is mounted (and is "free wheeling"), and prevents damage to the component parts involved due to overtorqueing in the forward or "negative" direction.

The knob 62 may be formed in its frontal area (see FIGS. 4 and 6) with the illustrated ever increasing arcuate or radial arrowhead (shown in FIGS. 4 and 6) indicating, for instance, that the processed media feed increases with rotation of the knob 62 counterclockwise. The knob 62 is molded to have the indicated radial arrowhead configuration on its front facing; the rest of the knob front facing may be hot stamped in white across the front facing of same, except where the arrowhead is located, which then would remain the color of the basic structure of the knob 62 (with black color being preferred for all end cap bodies 30 and 59), thus giving a strong color contrast and a symbol for the end user of the flowmeter assembly or unit 20B or 20C to identify with.

End cap internal threading 41 (see FIG. 7) is provided on the rear or back side of the bodies 59 of the respective end caps 22A and 24C that accommodates a variety of different plumbing adapters. Plumbing connections can also be made by incorporation as an integral part of the flowmeter end caps disclosed herein providing various configurations using inserts that would project from the rear of the flowmeter assembly or unit involved, allowing a direct connection to be made without the use of adapters. The threading 41 may be 10–32 threading, and may be of a type that accommodates the application to body 59 of different types of connectors and regardless of the material (for instance, brass or suitable plastic) employed to form same.

Alternately, the body 59 and its valve stem 60 may be proportioned as needed to accommodate the application to the body 59 of a set screw lock arrangement that fixes the valve stem 60 (as at its threading 68) to the body 59 against movement with respect thereto.

The end caps 22, 22A, 24, and 24C may be of any color and may be formed from any type of plastic material that is resilient, although as already indicated, molding of these components by any suitable molding procedure is preferred.

The end cap side flanges 44 and 46 that form the "snapping mechanisms" of the respective end caps that have been referred to, as illustrated, are arranged to accommodate various panel aperture widths and panel thicknesses. As to the panel aperture widths, the tolerance zone involved, for any end cap side flanges 44 and 46, is up to the maximum dimension between such flanges for the particular end cap in question.

An advantage of forming all components of the flowmeter assembly or unit 20 by molding (to the shaping indicated by the instant application) is that the material to be used for any particular flowmeter assembly or unit 20 is an option available for the forming of such flowmeter assembly or unit 20.

The cross flange 120 of the respective end caps 22, 22A, 24, and 24C, allows free flow of the process media through the flowmeter assembly or unit 20, while acting as a float stop for the individual end caps involved in a particular flowmeter assembly or unit 20.

As has been indicated, the snap fit mounting of a flowmeter assembly or unit 20 with respect to a particular panel 12 mounts the flowmeter assembly or unit 20 involved forwardly of the panel itself, and in coveting relation to any aperturing made in the panel for snap fit mounting of such flowmeter assembly or unit 20 on same; thus, such panel aperturing may be made as small as needed.

The foregoing description and the drawings are given merely to explain and illustrate the invention, and the invention is not to be limited thereto, except insofar as the appended claims are so limited, since those skilled in the art who have this disclosure before them will be able to make modifications and variations therein without departing from the scope of the invention.

I claim:

1. A flowmeter assembly comprising:

an elongate assembly body formed from a transparent acrylic material defining upper and lower ends, a rear wall, and oppositely disposed, essentially planar side walls disposed in coplanar relation on either side of said body, with said side walls having upper and lower ends that extend substantially, and substantially equally, beyond the respective said upper and lower ends of said side walls, respectively, said body having a bore centered therein extending longitudinally of same, an indicating float received in said body bore, said body bore uniformly tapering from the lower to the upper end thereof in a flowmeter manner, said body bore having a front facing that is convexly curved and centered on said body in overlying and centered relation to said bore, with said front facing defining a scale disposed for flowmeter readout in conjunction with said float, an inlet port adjacent one end of said body, an outlet port adjacent the other end of said body, a first end cap for mounting on said body at said inlet port and formed to interconnect said flowmeter assembly to the source of fluid process media flow to said flowmeter assembly, a second end cap for mounting on said body at said outlet port and formed to interconnect said flowmeter assembly for discharge of said fluid process flow therefrom, said end caps being mounted on either end of said assembly body, with each of said end caps defining an end cap body, and with the respective end cap bodies each defining a pair of elongate recesses disposed on either side of same receiving the respective said upper and lower ends of said side walls, respectively, for mounting said end caps on either end of said assembly body, means for keying said end caps to the respective said upper and lower ends of said side walls, respectively, and means self-contained by said assembly for snap-fit panel mounting said flowmeter assembly for operative relation on a support panel therefor in aperturing formed in such panel for that purpose, said self-contained means comprising snap-fit means carried by the respective said end caps for snap-fit mounting said assembly body forwardly of such panel aperturing, with said snap-fit means acting within such panel aperturing.

2. The flowmeter assembly set forth in claim 1 including:

valve means mounted in One Of said end caps for setting the flow rate of the fluid process media through said assembly, when said assembly is snap-fit mounted on such panel.

3. The flowmeter assembly set forth in claim 1, wherein;

said keying means comprises:

a cross-aperture formed in each of said side wall ends and a pair of cross-apertures formed in each of said end cap bodies, in which said side wall end cross apertures are respectively aligned with the respective said end cap cross-apertures to form cross-aperture locking sets when said end caps are respectively mounted on said assembly body, locking pin means including a separate locking pin for each of said locking sets and respectively disposed to enter said cross-apertures, respectively, when said end caps are respectively mounted on said assembly body, said locking pins being integrally united.

and means for making said locking pins fixed against removal from the respective sets of aligned cross-apertures for fixing said end caps, respectively, against removal from said assembly body.

4. The flowmeter assembly set forth in claim 3, wherein:

said assembly body and said end caps respectively, comprise components of said flowmeter assembly, and means for rendering said components disconnectable from said assembly, for replacing one or more of said components of said assembly after snap-fit dismounting of said assembly body from such panel, whereby said assembly provides the in-field option of replacing one or more of said components of said assembly after said snap-fit dismounting of said assembly body from such panel.

5. The flowmeter assembly set forth in claim 2, wherein said body of said one end cap is formed for securement to one end of said flowmeter bore and defines an internal passageway for communicating with said flowmeter bore in substantially consecutive relation thereto, and said valve means includes a valve stem threadedly mounted in said body of said one end cap passageway, said valve stem and said body of said one end cap being shaped internally thereof for defining at least two basic sizes tapered orifices, including a first orifice that is smaller in size than the other orifice, said valve stem defining first and second tear drop shaped portions for controlling the size of such orifices, said body of said one end cap and said valve stem having shaping internally of said body of said one end cap including means for providing overtorque protection for said one end cap.

6. The flowmeter assembly set forth in claim 5, including:

a knob located externally of said body of said one end cap and keyed to said valve stem for rotating same for threaded movement of said valve stem longitudinally thereof for disposing said valve stem relative to said one end cap body to control the size of said orifices.

7. The flowmeter assembly set forth in claim 6, wherein:

said knob is permanently affixed to said valve stem, and including means for preventing removal of said valve stem from said body of said one end cap.

8. The flowmeter assembly set forth in claim 6, wherein:

said knob is connected to said valve stem for optional removal therefrom, said valve stem projecting from said one end cap body within limits providing for tamperproofing of the position of said valve stem relative to said body of said one end cap in controlling the sizing of said orifices.

9. The flowmeter assembly set forth in claim 6, including:

means for affixing said valve stem relative to said one end cap body for fixing the sizing of said orifices.

10. The flowmeter assembly set forth in claim 5, wherein:

said end caps and said assembly body are of all molded formation.

11. The flowmeter assembly set forth in claim 1, wherein:

said scale is formed to the rear of said front facing in a manner to avoid parallax error.

12. The flowmeter assembly set forth in claim 1, wherein:

said front facing configuration is coincident with the centerline of said bore for elimination distortion of said float as viewed from said tube front facing.

13. The flowmeter assembly set forth in claim 1, wherein:

said end caps each include an external plumbing fitting at the rear of said flowmeter assembly.

* * * * *